United States Patent
Watanabe (10) Patent No.: US 9,692,970 B2
(45) Date of Patent: Jun. 27, 2017

(54) IMAGE PICKUP APPARATUS, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/728,350

(22) Filed: Jun. 2, 2015

(65) Prior Publication Data
US 2015/0358563 A1     Dec. 10, 2015

(30) Foreign Application Priority Data
Jun. 6, 2014 (JP) .................................. 2014-117507

(51) Int. Cl.
| H04N 5/235 | (2006.01) |
| H04N 5/76 | (2006.01) |
| H04N 5/232 | (2006.01) |
| H04N 5/357 | (2011.01) |

(52) U.S. Cl.
CPC ....... *H04N 5/23245* (2013.01); *H04N 5/2327* (2013.01); *H04N 5/3572* (2013.01)

(58) Field of Classification Search
CPC ............. H04N 5/23212; H04N 5/2353; H04N 5/23293; H04N 5/23216; H04N 5/2354; H04N 5/23219; H04N 5/2352; H04N 9/646; G02B 2027/0138; G06T 2207/10144; G06T 7/0022; G03B 17/24; G03B 7/093

USPC ....... 348/208.6, 208.13, 208.14, 333.11, 362
See application file for complete search history.

(56) References Cited

U.S. PATENT DOCUMENTS

| 2007/0009245 | A1 | 1/2007 | Ito | |
| 2009/0040364 | A1* | 2/2009 | Rubner | G06T 3/4053 348/362 |
| 2009/0073306 | A1* | 3/2009 | Kwon | H04N 5/2351 348/362 |
| 2009/0322902 | A1* | 12/2009 | Tengeiji | H04N 5/2254 348/229.1 |

(Continued)

FOREIGN PATENT DOCUMENTS

| JP | 2004205802 A | 7/2004 |
| JP | 2007019973 A | 1/2007 |

(Continued)

*Primary Examiner* — Trung Diep
(74) *Attorney, Agent, or Firm* — Rossi, Kimms & McDowell LLP (57) ABSTRACT

An image pickup apparatus includes a storage unit configured to store a relation between an aperture value and a shutter speed for image restoration, a control unit configured to set the aperture value and the shutter speed based on a shooting condition and the relation stored in the storage unit, and an image pickup unit configured to photoelectrically convert an optical image formed via an image pickup optical system with the set aperture value and shutter speed to output an image, and the image restoration is processing to reduce a deterioration of the image caused by an aberration of the image pickup optical system.

12 Claims, 7 Drawing Sheets

(56) References Cited

U.S. PATENT DOCUMENTS

2012/0229674 A1* 9/2012 Solomon ............... H04N 5/772
                                                                348/231.99
2013/0107063 A1 5/2013 Yano

FOREIGN PATENT DOCUMENTS

| | | |
|---|---|---|
| JP | 2007300269 A | 11/2007 |
| JP | 2012023650 A | 2/2012 |

\* cited by examiner

| | OBJECT DISTANCE 50cm ↔ ∞ | | | | |
|---|---|---|---|---|---|
| 18mm | F5.6 | F4 | F3.5 | F2.8 | F2.8 |
| | F8 | F4 | F3.5 | F2.8 | F2.8 |
| FOCAL LENGTH | F8 | F4 | F3.5 | F2.8 | F2.8 |
| | F8 | F5.6 | F4 | F3.5 | F3.5 |
| | F8 | F5.6 | F4 | F3.5 | F3.5 |
| | F8 | F5.6 | F4 | F3.5 | F3.5 |
| 135mm | F8 | F8 | F4 | F3.5 | F3.5 |

FIG. 2B

| | OBJECT DISTANCE 50cm ↔ ∞ | | | | |
|---|---|---|---|---|---|
| 18mm | F8 | F8 | F4 | F3.5 | F3.5 |
| | F8 | F8 | F4 | F3.5 | F3.5 |
| FOCAL LENGTH | F8 | F8 | F4 | F3.5 | F3.5 |
| | F8 | F8 | F4 | F3.5 | F3.5 |
| | F8 | F8 | F4 | F3.5 | F3.5 |
| | F8 | F8 | F4 | F3.5 | F3.5 |
| 135mm | F8 | F8 | F4 | F3.5 | F3.5 |

IMAGE PICKUP APPARATUS, METHOD OF CONTROLLING IMAGE PICKUP APPARATUS, AND NON-TRANSITORY COMPUTER-READABLE STORAGE MEDIUM

BACKGROUND OF THE INVENTION

Field of the Invention

The present invention relates to an image pickup apparatus which corrects deterioration of a shot image to achieve high definition.

Description of the Related Art

For an object shot via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the shot image is formed with the PSF convoluted with the image, and accordingly, the image is blurred and its resolution is deteriorated.

Recently, the shot image is typically stored as electronic data, and image restoration has been proposed which corrects an image deterioration caused by an optical system by performing image processing. However, when the shot image is deteriorated by a hand shake or an amount of the aberration of the image pickup optical system is large, it is difficult to perform the image restoration effectively. Furthermore, when an image is shot with a high ISO sensitivity in which a noise easily occurs, the noise is significantly amplified by the image restoration and thus it is difficult to acquire a high-definition image.

Japanese Patent Laid-open No. 2007-19973 discloses a configuration in which a shutter speed increases while performing a hand shake correction (image stabilizing operation) in order to suppress the deterioration of an image quality caused by the hand shake.

However, it is difficult to acquire a high-quality shot image considering image correction intentionally since a user does not know a condition (shooting condition to achieve an effect of image restoration) to perform the image restoration more effectively even when a function of the image restoration is incorporated in an image pickup apparatus.

In this regard, Japanese Patent Laid-open No. 2007-19973 does not consider a shooting condition such as a focal length of the image pickup apparatus, an F number, and an object distance, and a shutter speed. In other words, Japanese Patent Laid-open No. 2007-19973 does not disclose a configuration to perform the image restoration more effectively.

SUMMARY OF THE INVENTION

The present invention provides an image pickup apparatus, a method of controlling the image pickup apparatus, and a non-transitory computer-readable storage medium which are capable of performing image restoration effectively.

An image pickup apparatus as one aspect of the present invention provides includes a storage unit configured to store a relation between an aperture value and a shutter speed for image restoration, a control unit configured to set the aperture value and the shutter speed based on a shooting condition and the relation stored in the storage unit, and an image pickup unit configured to photoelectrically convert an optical image formed via an image pickup optical system with the set aperture value and shutter speed to output an image, and the image restoration is processing to reduce a deterioration of the image caused by an aberration of the image pickup optical system.

A method of controlling the image pickup apparatus as another aspect of the present invention includes the steps of referring to a storage unit which stores a relation between an aperture value and a shutter speed for image restoration and setting the aperture value and the shutter speed based on a shooting condition and the relation stored in the storage unit, and converting photoelectrically an optical image formed via an image pickup optical system with the set aperture value and shutter speed to output an image, and the image restoration is processing to reduce a deterioration of the image caused by an aberration of the image pickup optical system.

A non-transitory computer-readable storage medium as another aspect of the present invention stores a program causing a computer to execute a process including the steps of referring to a storage unit which stores a relation between an aperture value and a shutter speed for image restoration and setting the aperture value and the shutter speed based on a shooting condition and the relation stored in the storage unit, and converting photoelectrically an optical image formed via an image pickup optical system with the set aperture value and shutter speed to output an image, and the image restoration is processing to reduce a deterioration of the image caused by an aberration of the image pickup optical system.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First of all, an outline of an image processing method (image restoration) in this embodiment will be described. The following Expression (1) is satisfied where, in a real space (x,y), f(x,y) is an image which is not deteriorated by an optical system, h(x,y) is a PSF (point spread function), and g(x,y) is a deteriorated image.

$$g(x,y) = \iint f(X,Y) \cdot h(x-X, y-Y) dX dY \quad (1)$$

When the Fourier transform is performed for Expression (1) to convert the real space (x,y) to a frequency space (u,v), the following Expression (2) is satisfied.

$$G(u,v)=F(u,v)*H(u,v) \quad (2)$$

In Expression (2), F(u,v), G(u,v), and H(u,v) are results of the Fourier transform of f(x,y), g(x,y), and h(x,y), respectively. Therefore, the following Expression (3) is satisfied.

$$F(u,v)=G(u,v)/H(u,v) \quad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the inverse Fourier transform for F(u,v).

Actually, however, if such processing is performed to obtain the image which is not deteriorated, a noise caused by an image pickup element is amplified and a so-called ringing, such as a fine linear-shaped signal and a striped pattern, is highly likely to occur on the image. Thus, it is difficult to obtain an appropriate image with the division by simple inverse characteristics.

As a method of restoring an image to suppress the amplification of the noise, using the Wiener filter W(u,v) represented by the following Expression (4) is known.

$$W(u,v)=1/H(u,v)*|H(u,v)|^2/(|H(u,v)|^2+\Gamma) \quad (4)$$

In Expression (4), symbol H(u,v) denotes an optical transfer function (OTF), and symbol Γ denotes a constant to reduce an amount of the amplification of the noise.

Multiplying W(u,v) represented by Expression (4) by the result G(u,v) of the Fourier transform of the deteriorated image g(x,y), a phase component of the PSF caused due to the diffraction or the aberration that occurs in the optical system becomes zero and frequency characteristics of an amplitude component are amplified to be able to obtain a high-resolution and appropriate image. That is, the following Expression (5) is satisfied where R(u,v) is frequency space information of an image restored by the image restoration using the Wiener filter.

$$R(u,v)=G(u,v)*W(u,v) \quad (5)$$

Since the image restoration is a method of restoring an image by division of H(u,v) as an OTF, there are a lot of points in which H(u,v) indicates a value close to zero (i.e. problem of so-called "degradation" occurs) when an image is shot on a shooting condition in which an amount of aberration of the image pickup optical system is too large, and thus it is difficult to perform appropriate image processing. Similarly, it is difficult to perform the appropriate image processing when an acquired image is extremely deteriorated due to a hand shake. Furthermore, when the image is shot with a high ISO sensitivity in which a noise easily occurs, the noise is significantly amplified by the restoration and thus it is difficult to acquire a high-definition image.

In Expression (5), a higher resolution image can be acquired by the image restoration with the increase of |R(u,v)|. Typically, optical characteristics of the image pickup optical system vary depending on the condition (shooting condition) at the time of shooting an image. Therefore, processing is performed to suppress an amplification factor so as to affect the image due to occurrence of ringing or the like in the shooting condition in which there are a lot of points where H(u,v) indicates values close to zero. According to the shooting condition, |R(u,v)| does not become so large. In other words, this means that |R(u,v)| is controlled by the shooting condition considering adverse effects such as ringing.

When the image restoration is performed on the image shot by a digital camera, ideal restoration is to perform processing so that a restored OTF becomes entirely 1 over an entire band not greater than the Nyquist frequency of the image pickup element. However, when the ideal restoration is performed, there is a frequency band in which a value of the OTF is close to zero according to the shooting condition and the amplification factor at the point is extremely large as described above. In this case, adverse effects such as ringing may easily occur in the restored image, and on the contrary, the image may be deteriorated. In other words, the reality is that it is difficult to perform the ideal restoration considering manufacturing errors of the image pickup optical system and the image pickup element, disturbance at the time of shooting the image, a noise generated by the image pickup element, and the like. Accordingly, it is necessary to control the amplification factor so that a large amount of the amplification factor does not occur in the frequency band in which a value of the OTF is close to zero. Hereinafter, the fact that the value of the OTF is close to zero is referred to as degradation. Each embodiment below is performed or configured to solve the problem.

Embodiment 1

Figure 1:
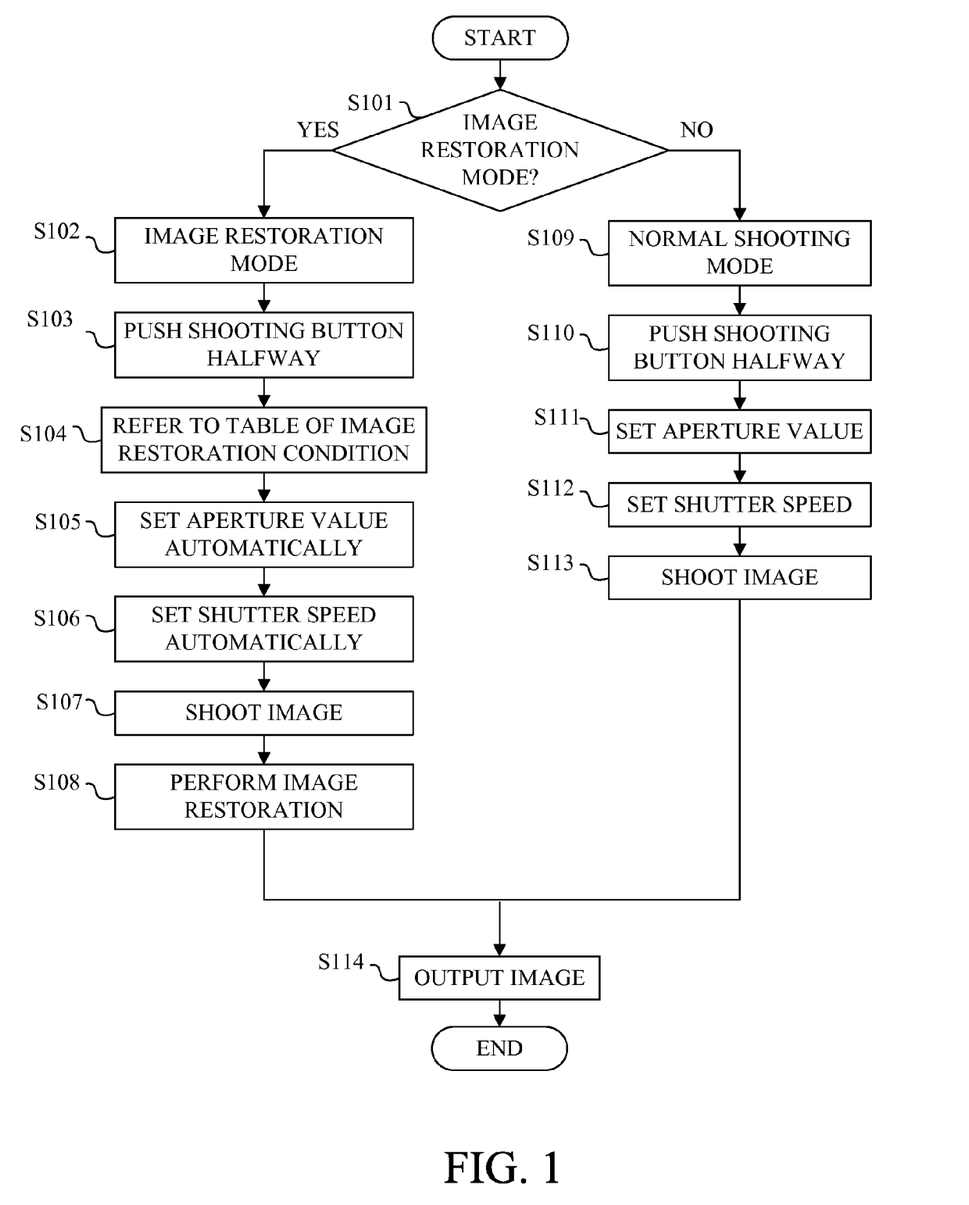
FIG. 1 is a flowchart of illustrating an operation of an image pickup apparatus in Embodiment 1.

First of all, referring to FIG. 1, an image shooting operation in Embodiment 1 of the present invention will be described. FIG. 1 is a flowchart of illustrating an operation (image shooting operation) of an image pickup apparatus in this embodiment, and it illustrates a flow of automatically setting a shooting condition suitable for image restoration. Each step in FIG. 1 is performed for example by a control unit (system controller 710), an image processing unit (image processor 704), an image pickup unit (image pickup element 702), and a storage unit (storage 708).

First, at step S101, the system controller 710 determines whether an image restoration mode is selected as a shooting mode. In other words, a user starts shooting an image after selecting, from the shooting modes, one of the image restoration mode in which the image restoration is performed or a normal shooting mode in which the image restoration is not performed. In this embodiment, for example the user operates an operating portion such as a GUI displayed on a display unit 705 of the image pickup apparatus 700, and thus one shooting mode is selected from the image restoration mode or the normal shooting mode. In this embodiment, other shooting modes can also be selected in addition to the image restoration mode and the normal shooting mode.

When the image restoration mode is selected at step S101, the system controller 710 sets the shooting mode to the image restoration mode at step S102. When the user presses a shooting button (release button) halfway at step S102, the system controller 710 acquires, at step S103, focal length information of an image pickup optical system and object distance information (or shooting distance information) while the shooting button is pressed halfway.

Subsequently, at step S104, the system controller 710 refers to an image restoration condition table. The image restoration condition table is a table indicating a relation of a focal length (focal length information), an object distance (object distance information), and an F number (aperture value). Details of the image restoration condition table will be described below. Then, at step S105, the system controller 710 acquires F number information (aperture value information) corresponding to the acquired focal length information and object distance information based on the image restoration condition table. Then, the system controller 710 sets the acquired F number information (F number) as an F number (aperture value) determined when shooting an image.

Subsequently, at step S106, the system controller 710 determines a shutter speed by using a program chart which is stored in the storage 708 of the image pickup apparatus to be used in the image restoration mode. The program chart indicates a relation of an EV (exposure value or object brightness), the F number, and the shutter speed for the image restoration mode, and details will be described below.

Subsequently, at step S107, the system controller 710 controls the image pickup element 702 to shoot an image. Then, at step S108, the system controller 710 controls the image processor 704 to perform the image restoration for the shot image to acquire a final image. Subsequently, at step S114, the system controller 710 displays the image processed by the image processor 704 (final image) on the display unit 705 or it records the image in an image recording medium 709 (output of the image). In this embodiment, the image restoration is performed inside the image pickup apparatus (by the image processor 704), but this embodiment is not limited thereto and can perform the image restoration by using a software on a computer provided separately from the image pickup apparatus.

On the other hand, when the normal shooting mode is selected at step S101, the system controller 710 sets the shooting mode to the normal shooting mode at step S109. When the user presses the shooting button (release button) halfway at step S110, the system controller 710 sets the F number (aperture value) at step S111, and it sets the shutter speed at step S112. In this case, the system controller 710 determines the F number (aperture value) and the shutter speed in a typical aperture priority mode or shutter speed priority mode. Subsequently, at step S113, the system controller 710 controls the image pickup element 702 to shooting an image. Then, at step S114, the system controller 710 displays the shot image on the display unit 705 or records the shot image in the image recording medium 709 (output of the image).

Figure 2A:
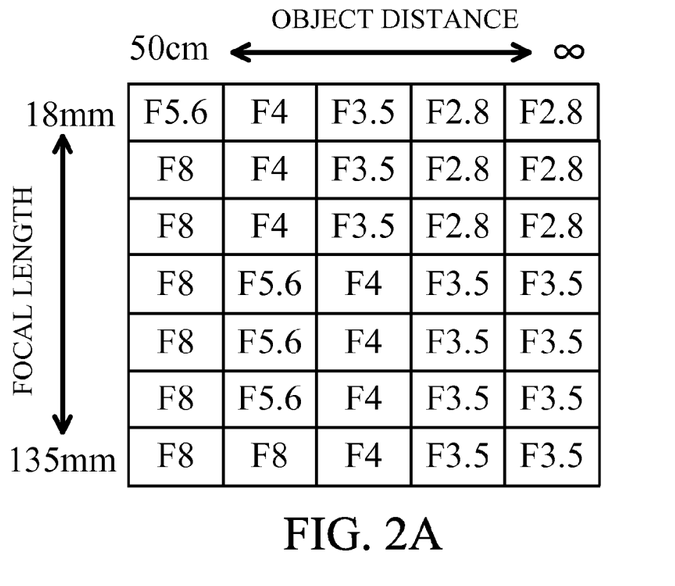
FIGS. 2A and 2B are image restoration condition tables in Embodiment 1.
Figure 2B:
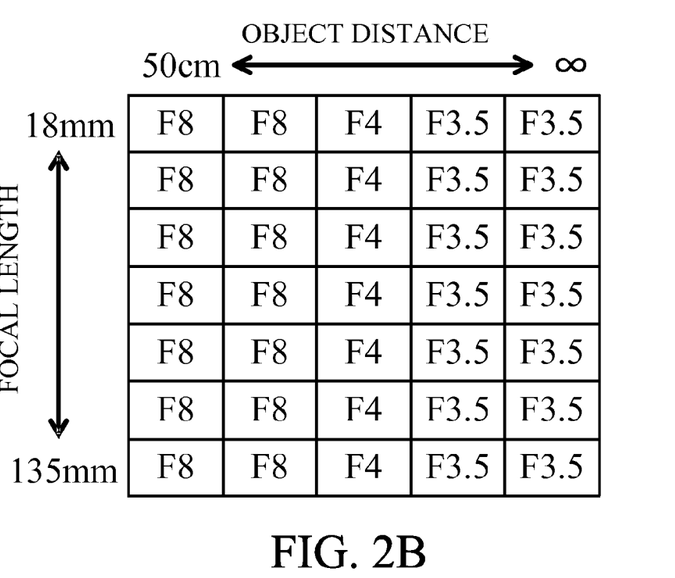

Next, referring to FIGS. 2A and 2B, the image restoration condition table in this embodiment will be described. FIGS. 2A and 2B are examples of the image restoration condition tables. As illustrated in FIGS. 2A and 2B, the image restoration condition table is a table in which the F number is uniquely determined by a combination of the focal length (focal length information) and the object distance (object distance information). This image restoration condition table is unique to the image pickup optical system, and the combination is previously determined to have a shooting condition in which an effect of the image restoration can be suitably achieved. The shooting condition in which the effect of the image restoration can be suitably achieved means satisfying the following three conditions. A first condition is that an optical transfer function (OTF) of the image pickup optical system remains up to the vicinity of the Nyquist frequency of the image pickup element (i.e. the OTF keeps a value not less than zero). A second condition is that an amount of a hand shake determined when shooting the image is small. A third condition is that an image is shot with a low ISO sensitivity in which a large amount of noise is not added to the image. Hereinafter, the effect of satisfying the three conditions will be described.

First, satisfying the first and second conditions, degradation does not occur in the OTF, i.e. an absolute value (MTF value) of the OTF is greater than zero over an entire band not more than the Nyquist frequency. Therefore, it is possible to perform the image restoration with an appropriate amplification factor for the shot image without occurrence of adverse effects such as ringing. Furthermore, satisfying the third condition, the noise which occurs in the shot image is reduced, and an amount of the noise does not increase even when the noise is amplified by the image restoration. As described above, satisfying the three conditions, it is possible to perform the image restoration appropriately while suppressing the adverse effects due to the occurrence or amplification of the ringing or noise.

Accordingly, the F number corresponding to the combination of the focal length and the object distance is determined to satisfy these three conditions. In order to satisfy the first condition, it is necessary to (automatically) set the shooting condition in which an amount of the aberration of the image pickup optical system is not too large. When the user shoots an arbitrary image, the object distance and the focal length are determined by the user. Therefore, the image restoration condition table is prepared to set the F number in which the amount of the aberration is not too large with respect to the object distance and the focal length determined by the user.

When an object which is pretty close is shot, a minute displacement in a depth direction with respect to a focal plane may cause optical characteristics to significantly vary. In this case, a region in which the restoration processing can be effectively performed decreases. Accordingly, it is preferred that an optimum F number is determined considering a depth of field in addition to the amount of the aberration. In particular, with respect to the F number, the following characteristics are known. In other words, when the object distance is close, according to the relation of a lateral magnification of the image pickup optical system and an object-side F number and an image-side F number, the object-side F number decreases and thus the depth of field is shallow. On the other hand, when the object distance is far away, the object-side F number increases and thus the depth of field is deep.

Therefore, it is preferred that the aperture stop is set to be in a full-open state when the object distance is at infinity, and that the aperture stop is gradually closed as the object distance is close to a closest range side. However, if the aperture stop is open too small, it is necessary to slow the shutter speed or to increase the ISO sensitivity to obtain a sufficient exposure amount. As a result, the image pickup apparatus has a low tolerance for the hand shake and the noise. Accordingly, in order to satisfy both the first and second conditions described above, it is preferred that the F number is set between the full-open state for example up to F8.

In view of these conditions, FIG. 2A is the image restoration condition table illustrating an example of the shooting condition in which the maximum effect of the image restoration can be experienced, and FIG. 2B is the image restoration condition table which has a priority to the depth of field. As described above, the image restoration condition table represents the combination of the shooting conditions to be recommended to the user, and it is preferred that various image restoration condition tables for each effect are stored in the image pickup apparatus.

Figure 3A:
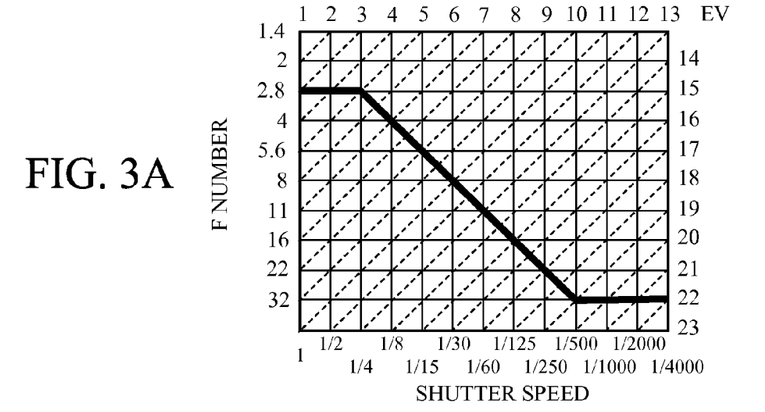
FIGS. 3A to 3C are program charts which are used in a normal shooting mode and an image restoration mode in Embodiment 1.
Figure 3B:
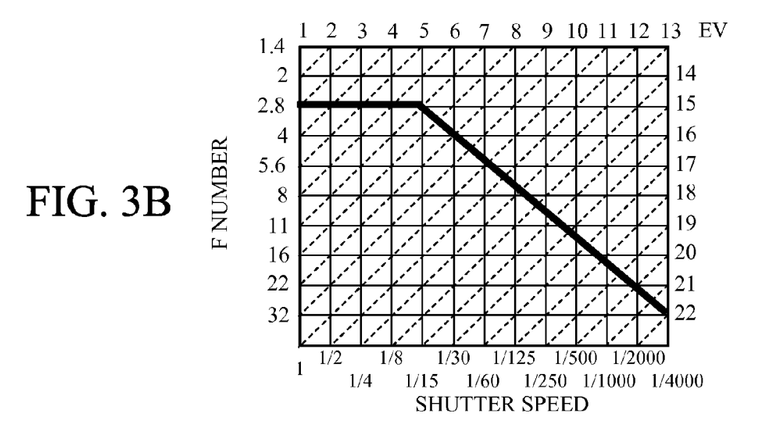
Figure 3C:
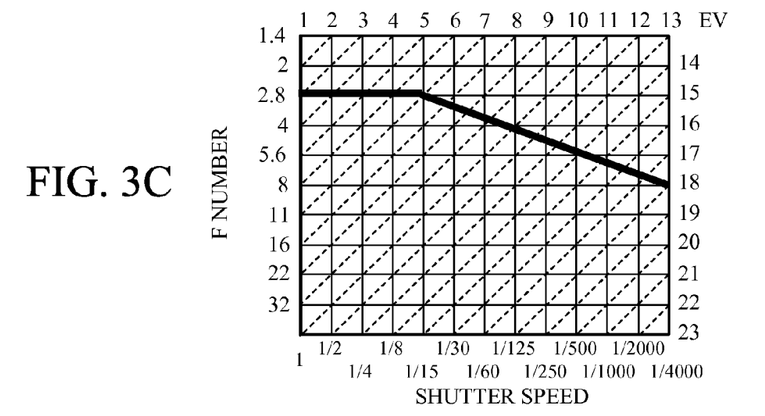

Next, referring to FIGS. 3A to 3C, a method of further satisfying the third condition in addition to the first and second conditions will be described. FIGS. 3A to 3C are program charts which are used in the normal shooting mode and the image restoration mode. The program chart is designed to determine the F number and the shutter speed uniquely according to the EV (exposure value) representing the object brightness.

FIG. 3A illustrates an example of the program chart which is used in the normal shooting mode. On the other hand, FIGS. 3B and 3C illustrate examples of the program charts which are used in the image restoration mode. FIG. 3B is the program chart which is shifted (changed) so that the F number decreases and the shutter speed increases with respect to the same EV, compared to the program chart, which is used in the normal shooting mode, illustrated in FIG. 3A. In this embodiment, using the F number which is acquired from the image restoration condition table illustrated in FIG. 2A or 2B, the shutter speed is set to be higher than that in the normal shooting mode. Thus, the deterioration of the image caused by the hand shake is suppressed and the ISO sensitivity is decreased, and therefore the noise can be reduced. Accordingly, it is possible to reduce the deterioration of the image quality caused by significant reduction of the image restoration effect due to lack of frequency information or by an amplification of the noise component.

FIG. 3C is the program chart, which is set to be operable only within a range of the EV of 1 to 18, having the shutter speed higher than that of the program chart illustrated in FIG. 3B. The program chart in FIG. 3C limits the aperture value to be not greater than F8. Thus, it is a program chart to achieve the maximum effect of the image restoration after shooting the image. This embodiment illustrates, as program charts used in the image restoration, the program chart (FIG. 3B) which is simply shifted compared to the program chart (FIG. 3A) used in the normal shooting mode and the program chart (FIG. 3C) which limits the EV to increase the shutter speed. However, this embodiment is not limited thereto, and other program charts may be used as program charts for the image restoration mode.

Embodiment 2

Next, Embodiment 2 of the present invention will be described. This embodiment describes a method of creating the image restoration condition tables illustrated in FIGS. 2A and 2B in detail.

The image restoration ideally restores an image so that the OTF becomes 1 over an entire frequency band of the image pickup element. However, the OTF of a typical image pickup optical system varies depending on a focal length, an F number, an object distance, and an image height position, and frequency degradation of the OTF may occur according to the shooting condition. The frequency degradation of the OTF is mainly caused by the aberration or the hand shake. In this case, closing the aperture stop to increase the F number, the aberration, depending on the F number, such as a spherical aberration and a coma aberration can be reduced. Furthermore, setting the depth of field to be deep, the influence of the hand shake is reduced and thus an absolute value of the OTF (modulation transfer function: MTF) can be increased. On the other hand, when the F number becomes too large, the depth of field increases but the shutter speed needs to be decreased, and as a result, the image pickup apparatus has a low tolerance for the hand shake. Accordingly, it is preferred that a settable F number is limited to a value not greater than a predetermined F number such as F8.

Typically, the frequency characteristics of the optical image (PSF) acquired by the image pickup optical system are the best at the center on an imaging plane and are deteriorated with distance from the center.

Figure 4A:
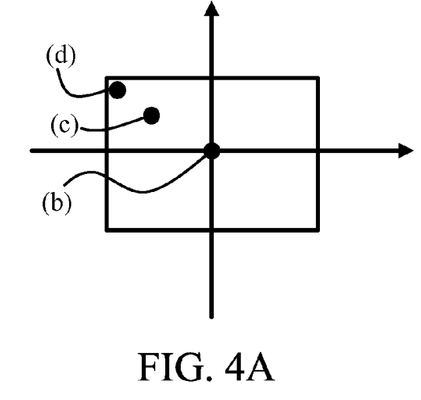
FIGS. 4A to 4D are diagrams of illustrating an example of an MTF for each image height when an F number is small in Embodiment 2.
Figure 4B:
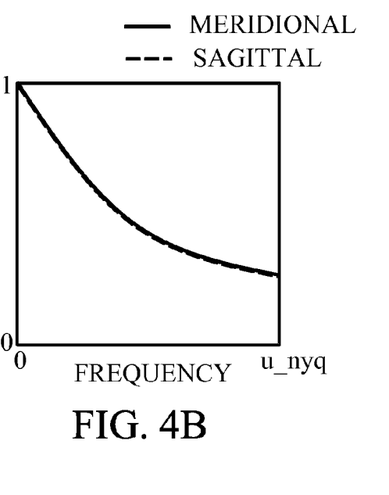
Figure 4C:
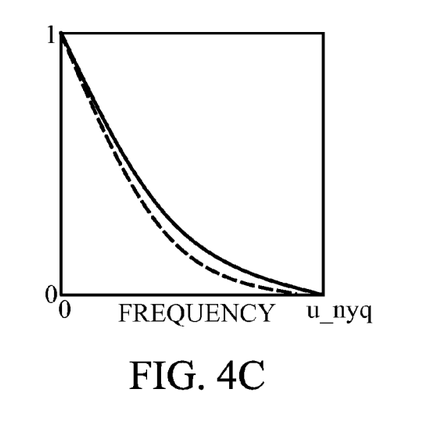
Figure 4D:
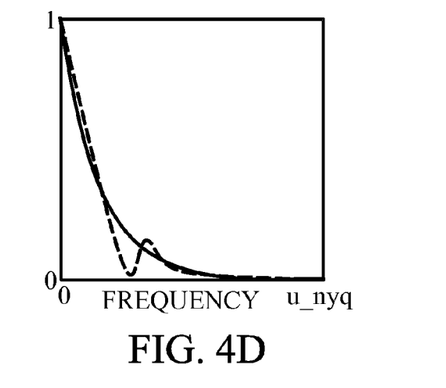

FIGS. 4A to 4D are diagrams of an example of the MTF for each image height when the F number to create the image restoration condition table is small, and illustrate evaluation positions of the optical characteristics of the image pickup optical system and the MTF for the object distance of 100 cm, the focal length of 18 mm, and the aperture value of F2.8. The MTF means the absolute value of the OTF. FIG. 4A illustrates the evaluation position of the optical characteristics on the imaging plane. The MTFs at positions of points (b), (c), and (d) in FIG. 4A are illustrated in FIGS. 4B, 4C, and 4D, respectively. In each of FIGS. 4B to 4D, a solid line indicates characteristics in a meridional direction, and a dashed line indicates characteristics in a sagittal direction. In each of FIGS. 4B to 4D, a vertical axis and a lateral axis indicate the MTF and the frequency (from 0 to the Nyquist frequency), respectively.

A relation between the MTF that is the absolute value of the OTF at each position and the image restoration will be described. As illustrated in FIG. 4B, at the center image height (at the center on the imaging plane), the image restoration can be effectively performed since the MTF sufficiently remains (the MTF is not less than zero over an entire frequency band up to the Nyquist frequency). However, at the center image height as illustrated in FIG. 4B, it is possible to acquire a sufficiently high-definition image without performing the image restoration.

On the other hand, as illustrated in FIG. 4C, at the position of around five to six out of ten in the image pickup optical system (position between the center and the extreme periphery on the imaging plane), the MTF has characteristics so that a response near the Nyquist frequency of the image pickup element is zero. Therefore, the performance before the image restoration is not so good and blurring of the image occurs. When the image restoration is performed on the image at such positions, the restoration effect is hardly achieved in the frequency band near the Nyquist frequency, but a sufficient restoration effect can be achieved in an intermediate band from a low frequency to the Nyquist frequency.

As illustrated in FIG. 4D, at the position of the extreme periphery on the imaging plane, the MTF is totally low and a response in a low-frequency region indicates a value close to zero. In this case, the MTF can be increased only by a minute amount even when the restoration processing is performed. Therefore, the user can hardly feel the difference between the restored image and the unrestored image even when the restoration processing is performed.

As illustrated in FIGS. 4A to 4D, when the object distance is 100 cm and the focal length is 18 mm, shooting the image with the aperture value of F2.8 is not a shooting condition in which the image restoration effect is maximized.

FIGS. 5A to 5D are diagrams of illustrating an example of the MTF for each image height when the F number to create the image restoration condition table is large, and illustrate evaluation positions of the optical characteristics of the image pickup optical system and the MTF for the aperture value of F4. In FIGS. 5A to 5D, the focal length of the image pickup optical system and the object distance are the same as those in FIGS. 4A to 4D.

Figure 5A:
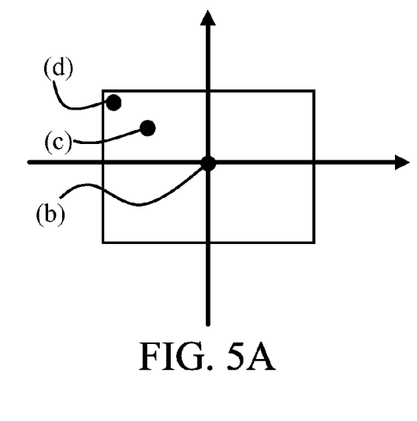
FIGS. 5A to 5D are diagrams of illustrating an example of the MTF for each image height when the F number is large in Embodiment 2.
Figure 5B:
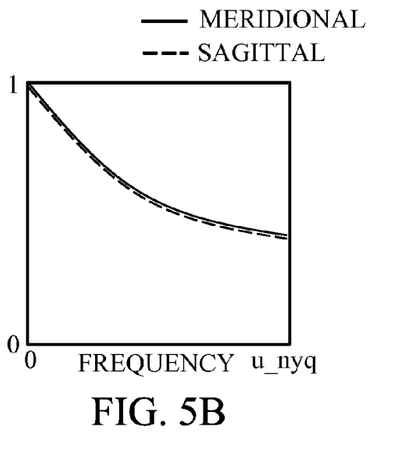
Figure 5C:
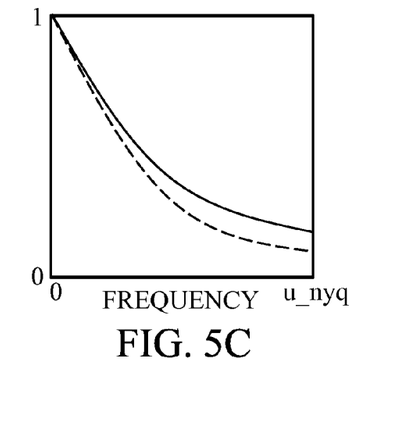
Figure 5D:
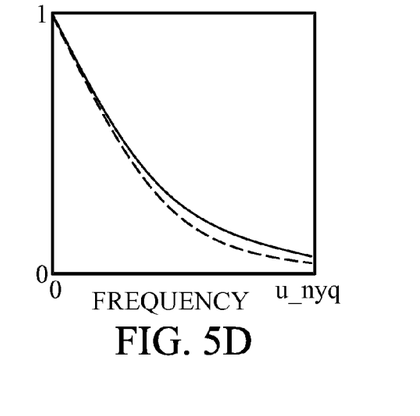

As illustrated in FIG. 5B, at the center image height (at the center on the imaging plane), there is no remarkable change compared to the case of F2.8 (FIG. 4B), but the MTF is originally appropriate over the entire band of the frequency space. Therefore, an amount which can be amplified by the image restoration is small, and the user hardly feels the difference. On the other hand, in FIG. 5C, compared to FIG. 4C, a frequency response around 0.2 remains up to neighborhood of the Nyquist frequency and the entire frequency band can be amplified sufficiently. FIG. 5D, compared to FIG. 4D, indicates a value around zero near the Nyquist frequency, but there is a sufficient response in the intermediate frequency and thus the restoration effect can be achieved in this band.

Although the method described above is a method of determining the F number on conditions that the frequency degradation of the MTF does not occur over all image heights in the shot image, the F number may be too large in a specific image pickup optical system when the F number is determined in the conditions. In this case, the conditions can be eased to avoid occurrence of the frequency degradation of the MTF within a specific image height range.

Figure 6:
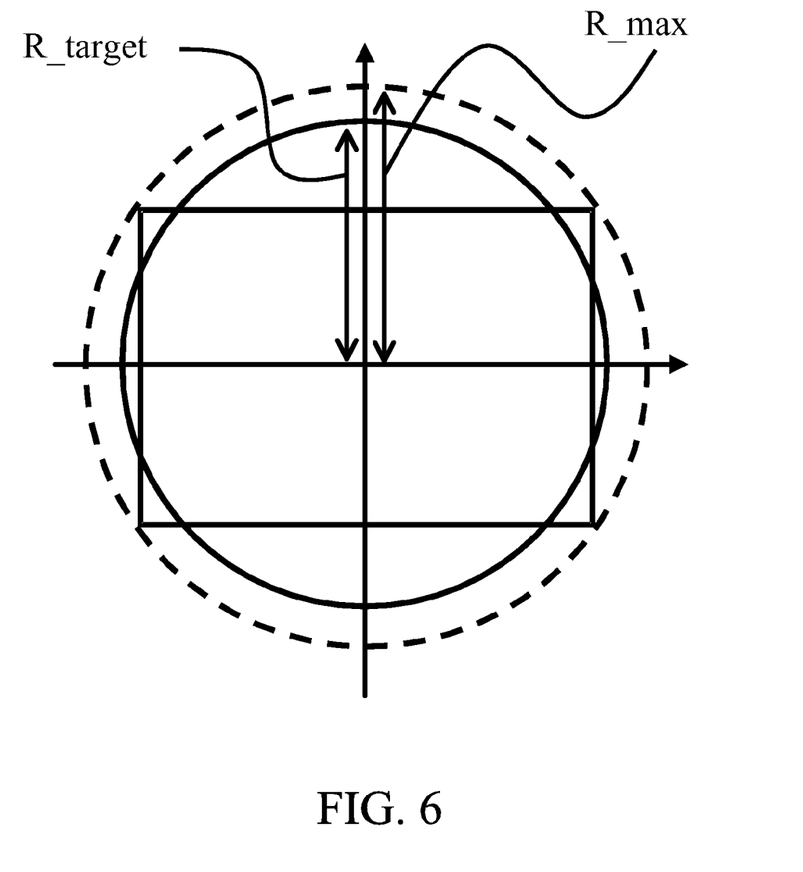
FIG. 6 is a diagram of illustrating an example of determining a region in which a degradation of the MTF does not occur in Embodiment 2.

Subsequently, referring to FIG. 6, a method of determining the region in which the frequency degradation dos not occur when creating the image restoration condition table will be described. FIG. 6 is a diagram of an example of the determination of the region, for creating the image restoration condition table, in which the degradation of the MTF does not occur. FIG. 6 illustrates a maximum radius R_max of an image circle of the image pickup optical system and a maximum image height radius R_target in which the MTF value indicates the value greater than zero (i.e. the degradation of the MTF does not occur). For example, when appropriate restoration up to around eight out of ten of the image pickup optical system only needs to be performed, the F number may be determined so that the degradation of the MTF does not occur within a range of R_target/R_max≤0.8. The ratio can be previously determined depending on the intension of a designer, or alternatively the user may determine it at the time of shooting an image.

Embodiment 3

Figure 7:
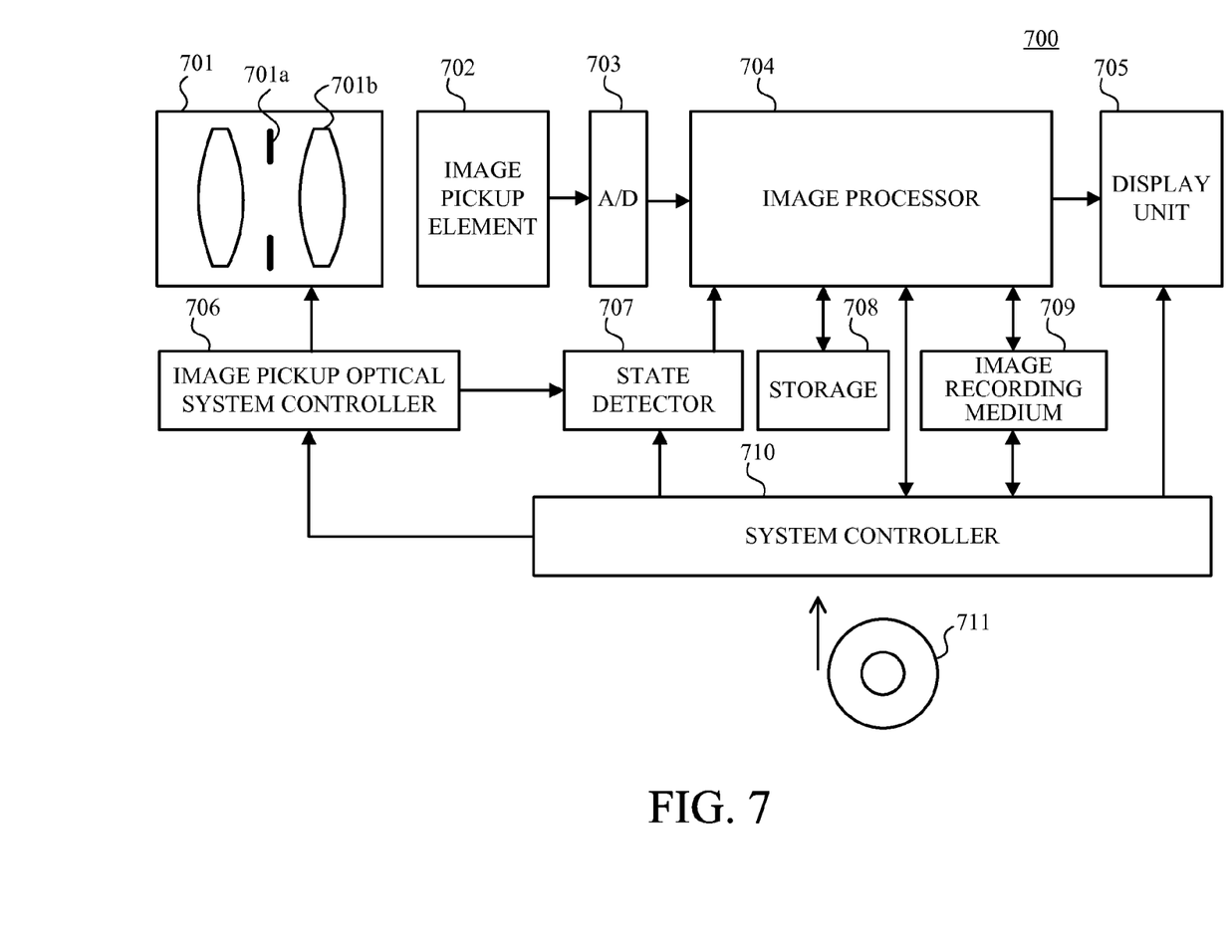
FIG. 7 is a block diagram of an image pickup apparatus in Embodiment 3.

Next, referring to FIG. 7, an image pickup apparatus in Embodiment 3 of the present invention will be described. FIG. 7 is a block diagram of an image pickup apparatus 700 in this embodiment. The image pickup apparatus 700 is capable of performing the image pickup method (image processing method) described with reference to FIG. 1.

In the image pickup apparatus 700, an object (not illustrated) is imaged on an image pickup element 702 via an image pickup optical system 701 including an aperture stop 701a (or light blocking member) and a focus lens 701b. An aperture value (F number) is determined by the aperture stop 701a or the light blocking member. The image pickup element 702 (image pickup unit) photoelectrically converts an object image (optical image) formed via the image pickup optical system 701 to output an image (shot image). The shot image (imaged light) output from the image pickup element 702 is converted to an electric signal and then output to an A/D converter 703. The A/D converter 703 converts the electric signal (analog signal) input from the image pickup element 702 to a digital signal and then outputs the digital signal to the image processor 704.

The image processor 704 performs the image processing (image restoration), as well as predetermined processing, in the image pickup method described with reference to FIG. 1. First of all, the image processor 704 acquires a shooting condition (shooting condition information) of the image pickup apparatus 700 from a state detector 707. The shooting condition information includes an aperture value (F number), a shooting distance (object distance), a focal length of the zoom lens, and the like. The state detector 707 is capable of acquiring the shooting condition information directly from a system controller 710, and for example it can also acquire shooting condition information on the image pickup optical system 701 from an image pickup optical system controller 706. A storage 708 (storage unit) stores optical transfer function information (OTF information) for each shooting condition (for each combination of the focal length, the F number, the shooting distance, the image height, the pixel size of the image pickup element 702, identification information of the image pickup optical system 701, and the like).

An output image (restored image) processed by the image processor 704 is recorded in an image recording medium 709 in a predetermined format. A display unit 705 displays an image obtained by performing predetermined processing for display on the processed image in this embodiment. Alternatively, the display unit 705 may display an image obtained by performing simple processing for high-speed display. The display unit 705 also displays a GUI to select an image restoration mode or a normal shooting mode by a user. When the image restoration mode is selected by the user via the GUI on the display unit 705, the system controller 710 controls the image processor 704 to perform the image processing method described with reference to FIG. 1.

The image pickup element 702 photoelectrically converts an optical image formed via the image pickup optical system 701 to output an image (shot image). In this case, the system controller 710 acquires the shooting condition determined when the shutter button is pressed halfway, such as the identification information of the image pickup optical system 701, the focal length determined when shooting the image, the shooting distance, the image height, and the pixel size of the image pickup element 702, from the image pickup optical system controller 706 or the state detector 707. Furthermore, the system controller 710 acquires and controls the F number (aperture value) referring to an image restoration condition table. The A/D converter 703 converts an analog signal corresponding to the optical image output from the image pickup element 702 to a digital signal.

The image processor 704 generates an image restoration filter based on OTF information related to the shooting condition determined with reference to the image restoration condition table, and performs the image restoration on the shot image to output a restored image. The image processor 704 is connected to the image recording medium 709 to record the shot image containing the shooting condition information. The OTF information corresponding to the shooting condition at the time of capturing the shot image recorded in the image recording medium 709 are stored in the storage 708 as described above. The system controller 710 includes a CPU, an MPU, or the like, and it controls a whole of the image pickup apparatus 700.

In this embodiment, the image pickup optical system 701 (lens apparatus) is configured integrally with the image pickup apparatus 700 (image pickup apparatus body), but is not limited thereto. Alternatively, the image pickup optical system 701 may be an interchangeable lens which is removably mounted on the image pickup apparatus body such as a single-lens reflex camera.

As described above, in each embodiment, a storage unit (storage 708) stores a relation between an aperture value and a shutter speed for image restoration. A control unit (system controller 710) sets the aperture value and shutter speed based on a shooting condition and the relation stored in the storage unit. An image pickup unit (image pickup element 702) photoelectrically converts an optical image formed via an image pickup optical system 701 with the set aperture value and the shutter speed to output an image. The image restoration is processing to reduce a deterioration of the image caused by an aberration of the image pickup optical system.

Preferably, the control unit is capable of selectively setting a mode from among shooting modes including a normal shooting mode and an image restoration mode. The shutter speed to be used in the image restoration mode is faster than or equal to the shutter speed to be used in the normal shooting mode. Preferably, the aperture value to be used in the image restoration mode is less than or equal to the aperture value to be used in the normal shooting mode.

Preferably, the storage unit stores the aperture value in connection with a combination of an object distance and a focal length as the shooting condition. More preferably, as the aperture value, a first aperture value is set for a first object distance, and a second aperture value greater than the first aperture value is set for a second object distance shorter than the first object distance. In other words, the aperture value is set to increase as the object distance decreases.

Preferably, the storage unit stores a table (image restoration condition table) indicating a relation of the object distance, the focal length, and the aperture value, and a program chart indicating a relation of an exposure value (EV), the aperture value, and the shutter speed. The control unit determines the aperture value based on the object distance and the focal length with reference to the table. Furthermore, the control unit determines the shutter speed based on the aperture value and the exposure value with reference to the program chart. More preferably, the storage unit stores a second program chart (for example, FIG. 3C) in which a range of the exposure value is limited within a predetermined range (for example, EV≤18). The control unit determines the shutter speed with reference to the second program chart, instead of for example the program chart of FIG. 3B, when the exposure value is within the predetermined range.

Preferably, the aperture value is set so that an MTF value indicates a value greater than zero within a predetermined image height range. For example, an expression of R_target/R_max≤0.8 is satisfied, where R_max is a maximum radius of an image circle of the image pickup optical system, and R_target is a maximum image height radius in which the MTF value indicates the value greater than zero.

According to each embodiment, an image pickup apparatus, a method of controlling the image pickup apparatus, and a non-transitory computer-readable storage medium (storage medium 711 in FIG. 7) which are capable of performing image restoration effectively can be provided. Furthermore, a compact image pickup apparatus which is capable of acquiring high-definition image can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117507, filed on Jun. 6, 2014, which is hereby incorporated by reference wherein in its entirety.

What is claimed is:

1. An image pickup apparatus comprising:
    a storage unit configured to store a relation between an aperture value and a shutter speed for image restoration, the relation being such that the shutter speed is determined using the aperture value;
    a control unit configured to set the aperture value based on an object distance and a focal length and to set the shutter speed based on the relation stored in the storage unit; and
    an image pickup unit configured to photoelectrically convert an optical image formed via an image pickup optical system with the set aperture value and shutter speed to output an image,
    wherein the image restoration is processing to reduce a deterioration of the image caused by an aberration of the image pickup optical system.

2. The image pickup apparatus according to claim 1,
    wherein the control unit is capable of selectively setting a mode from among shooting modes including a normal shooting mode and an image restoration mode, and
    wherein the shutter speed to be used in the image restoration mode is not less than the shutter speed to be used in the normal shooting mode.

3. The image pickup apparatus according to claim 1,
    wherein the control unit is capable of selectively setting a mode from among shooting modes including a normal shooting mode and an image restoration mode, and
    wherein the aperture value to be used in the image restoration mode is not greater than the aperture value to be used in the normal shooting mode.

4. The image pickup apparatus according to claim 1,
    wherein the storage unit stores the aperture value in connection with a combination of the object distance and the focal length.

5. The image pickup apparatus according to claim 4,
    wherein, as the aperture value, a first aperture value is set for a first object distance and a second aperture value greater than the first aperture value is set for a second object distance shorter than the first object distance.

6. The image pickup apparatus according to claim 4, wherein the storage unit stores a table indicating a relation of the object distance, the focal length, and the aperture value, and a program chart indicating a relation of an exposure value, the aperture value, and the shutter speed, and wherein the control unit is configured to:

determine the aperture value based on the object distance and the focal length with reference to the table, and determine the shutter speed based on the aperture value and the exposure value with reference to the program chart.

7. The image pickup apparatus according to claim 6, wherein the storage unit stores a second program chart in which a range of the exposure value is limited within a predetermined range, and wherein the control unit is configured to determine the shutter speed with reference to the second program chart when the exposure value is within the predetermined range.

8. The image pickup apparatus according to claim 1, wherein the aperture value is set so that an MTF value indicates a value greater than zero within a predetermined image height range.

9. The image pickup apparatus according to claim 8, wherein a following expression is satisfied:

$R\_target/R\_max \leq 0.8$, where $R\_max$ is a maximum radius of an image circle of the image pickup optical system, and $R\_target$ is a maximum image height radius in which the MTF value indicates the value greater than zero.

10. The image pickup apparatus according to claim 1, further comprising an image processing unit configured to perform the image restoration for the image output from the image pickup unit.

11. A method of controlling an image pickup apparatus, the method comprising the steps of:

referring to a storage unit which stores a relation between an aperture value and a shutter speed for image restoration, the relation being such that the shutter speed is determined using the aperture value, setting the aperture value based on an object distance and a focal length, and setting the shutter speed based on the relation stored in the storage unit; and converting photoelectrically an optical image formed via an image pickup optical system with the set aperture value and shutter speed to output an image, wherein the image restoration is processing to reduce a deterioration of the image caused by an aberration of the image pickup optical system.

12. A non-transitory computer-readable storage medium which stores a program causing a computer to execute a process comprising the steps of:

referring to a storage unit which stores a relation between an aperture value and a shutter speed for image restoration, the relation being such that the shutter speed is determined using the aperture value, setting the aperture value based on an object distance and a focal length, and setting the shutter speed based on the relation stored in the storage unit; and converting photoelectrically an optical image formed via an image pickup optical system with the set aperture value and shutter speed to output an image, wherein the image restoration is processing to reduce a deterioration of the image caused by an aberration of the image pickup optical system.

* * * * *